United States Patent
Malan

(10) Patent No.: US 11,016,960 B2
(45) Date of Patent: May 25, 2021

(54) SYSTEMS AND METHODS TO RECORD AND VERIFY VIRTUAL ITEM TRANSACTIONS

(71) Applicant: Roblox Corporation, San Mateo, CA (US)

(72) Inventor: Arthur Malan, Menlo Park, CA (US)

(73) Assignee: Roblox Corporation, San Mateo, CA (US)

(*) Notice: Subject to any disclaimer, the term of this patent is extended or adjusted under 35 U.S.C. 154(b) by 0 days.

(21) Appl. No.: 16/779,425

(22) Filed: Jan. 31, 2020

(65) Prior Publication Data

US 2020/0175001 A1 Jun. 4, 2020

Related U.S. Application Data

(63) Continuation-in-part of application No. 15/883,447, filed on Jan. 30, 2018, now abandoned.

(51) Int. Cl.
*G06F 16/00* (2019.01)
*G06F 16/23* (2019.01)
(Continued)

(52) U.S. Cl.
CPC ........ *G06F 16/2379* (2019.01); *A63F 13/792* (2014.09); *G06F 16/27* (2019.01);
(Continued)

(58) Field of Classification Search
CPC .... G06F 16/2379; G06F 16/27; A63F 13/792; H04L 9/0643; G06Q 20/389; G06Q 2220/00
(Continued)

(56) References Cited

U.S. PATENT DOCUMENTS 8,576,283 B1 11/2013 Foster et al.
2011/0184910 A1 7/2011 Love
(Continued)

FOREIGN PATENT DOCUMENTS

KR 20100061623 6/2010
WO 2017160992 9/2017

OTHER PUBLICATIONS

International Preliminary Report of Patentability in PCT/US2019/013852 filed Jan. 16, 2019, dated Aug. 13, 2020, 5 pages.
(Continued)

*Primary Examiner* — Daniel A Hess
(74) *Attorney, Agent, or Firm* — IP Spring

(57) ABSTRACT

Systems and methods to perform virtual item transactions within a collaboration platform. In some implementations, entries in a secure ledger are generated to record transactions of virtual items making up an exchange or trade transaction. Entries in the secured ledger are each linked to a preceding entry using one or more hash values. A claim can be received from a first user account to dispute a transaction. Responsive to the claim, the transaction can be verified and an account restore operation can be performed when a transaction was not completed according to user intent, and virtual items can be restored to user accounts when a transaction was not completed as intended according to the secure ledger.

20 Claims, 9 Drawing Sheets

(51) Int. Cl.
  *G06F 16/27* (2019.01)
  *A63F 13/792* (2014.01)
  *H04L 9/06* (2006.01)
  *G06Q 20/38* (2012.01)

(52) U.S. Cl.
  CPC ......... *H04L 9/0643* (2013.01); *G06Q 20/389* (2013.01); *G06Q 2220/00* (2013.01)

(58) Field of Classification Search
  USPC .......................................................... 235/375
  See application file for complete search history.

(56) References Cited

U.S. PATENT DOCUMENTS

| | | | |
|---|---|---|---|
| 2015/0278757 A1 | 10/2015 | Walden | |
| 2017/0046604 A1 | 2/2017 | Kaye | |
| 2017/0109734 A1 | 4/2017 | Kote | |
| 2017/0235896 A1 | 8/2017 | Debusk et al. | |
| 2020/0406145 A1* | 12/2020 | Lee | A63F 13/69 |

OTHER PUBLICATIONS

Crosby, et al., "BlockChain Technology", Beyond Bitcoin (PDF) (Report). Sutardja Center for Entrepreneurship & Technology Technical Report. University of California, Berkeley. (http://scet.berkeley.edu/wp-content/uploads/Blockchainpaper.pdf), Oct. 16, 2015, 35 pages.

USPTO, Non-Final Office Action mailed for U.S. Appl. No. 15/883,447, dated Apr. 17, 2019, 8 pages.

USPTO, Non-Final Office Action mailed for U..S. Appl. No. 15/883,447, dated Jul. 12, 2018, 8 pages.

USPTO, Final Office Action mailed for U.S. Appl. No. 15/883,447, dated Jul. 31, 2019, 10 pages.

USPTO, Final Office Action mailed for U.S. Appl. No. 15/883,447, dated Nov. 13, 2018, 8 pages.

WIPO, International Search Report and Written Opinion mailed for International application No. PCT/US2019/013852, dated Mar. 22, 2019, 12 pages.

* cited by examiner

| 602 | 604 | 606 | 608 | 610 | 612 | 614 |
|---|---|---|---|---|---|---|
| Entry Type: Transaction Start | Entry Type: Transaction In Progress | Entry Type: Item Transfer | Entry Type: Item Transfer | Entry Type: Item Transfer | Entry Type: Item Transfer | Entry Type: Transaction Resolved |
| Hash Value | Hash Value | Hash Value | Hash Value | Hash Value | Hash Value | Hash Value |
| Hash Value Field | Hash Value Field | Hash Value Field | Hash Value Field | Hash Value Field | Hash Value Field | Hash Value Field |
| Timestamp | Timestamp | Timestamp | Timestamp | Timestamp | Timestamp | Timestamp |
| Trader 1 | Transaction start entry | Trader 1 | Trader 2 | Transaction in progress entry | Transaction in progress entry | Transaction status |
| Trader 2 | Trader 1 Items: Item A | Transaction in progress entry | Transaction in progress entry | Trader 1 | Trader 2 | Transaction start entry |
| | Trader 2 Items: Item B | Item A | Item B | Item B | Item A | Transaction in progress entry |

FIG. 6

SYSTEMS AND METHODS TO RECORD AND VERIFY VIRTUAL ITEM TRANSACTIONS

RELATED APPLICATIONS

This application is a continuation-in-part of U.S. application Ser. No. 15/883,447, entitled "Chain of Custody in Gaming Platforms," and filed on Jan. 30, 2018, which is incorporated herein by reference in its entirety.

TECHNICAL FIELD

This disclosure relates to the field of collaboration platforms and, in particular, to systems and methods to record and verify virtual item transactions (e.g., transactions of virtual game items) within a collaboration platform using a cryptographically secure electronic ledger and performing a transaction verification and an account restore operation based on the cryptographically secure electronic ledger.

BACKGROUND

Collaboration platforms allow users to connect to and share information with each other via the Internet. Users of a collaboration platform, such as a gaming platform, may participate in multi-user gaming environments, design custom gaming environments, decorate avatars, or exchange virtual items with other users, and so forth.

SUMMARY

Some implementations include a method, comprising receiving, at a collaboration platform, an indication of a start of a transaction between a first user account and a second user account of the collaboration platform, and responsive to the indication, generating, by the collaboration platform, a transaction start entry in a secure ledger, the transaction start entry including a hash value and a previous entry hash value associated with a previous entry in the secure ledger, and the transaction start entry including a first user account identifier associated with the first user account and a second user account identifier associated with the second user account. The method can also include receiving, at the collaboration platform, a first identifier of a first virtual item to be transferred from the first user account to the second user account within the collaboration platform as a first part of the transaction, and receiving, at the collaboration platform, a second identifier of a second virtual item to be transferred from the second user account to the first user account within the collaboration platform as a second part of the transaction.

The method can further include performing the transaction by generating a plurality of entries in the secure ledger to record the first part of the transaction and the second part of the transaction, wherein each entry in the secure ledger is linked to a preceding entry in the secure ledger using one or more hash values and includes one of the first identifier or the second identifier, and creating, using the collaboration platform, a transaction resolved entry in the secure ledger indicating that the transaction has been resolved.

The method can also include receiving a claim from the first user account to dispute the transaction, responsive to the claim, performing, using the collaboration platform, a transaction verification operation, and when a result of the transaction verification operation indicates that the transaction was not resolved according to a transaction in progress entry in the secure ledger, performing an account restore operation based on the secure ledger, wherein the account restore operation retrieves the first virtual item from another user account identified as a last entry in the secure ledger having possession of the first virtual item and restores the first virtual item to the first user account.

In some implementations, the first identifier of the first virtual item comprises a unique identifier that is associated with the first virtual item and the second identifier of the second virtual item comprises a unique identifier that is associated with the second virtual item. In some implementations, the collaboration platform is a virtual game platform. In some implementations, the first virtual item and the second virtual item are virtual game items.

In some implementations, the virtual game items are user-generated virtual game items. The method can further include generating one or more additional entries in the secure ledger based on the account restore operation, wherein the one or more additional entries record one or more additional transactions to transfer the first virtual item from the user account identified as the last entry in the secure ledger to the first user account.

The method can also include, responsive to performing the account restore operation, performing a punitive operation on the second user account. In some implementations, the punitive operation include includes one of suspending the second user account, terminating the second user account, or suspending a particular function of the second user account while maintaining an ability to execute other functions of the second user account.

Some implementations include a system, comprising a processing device, and a memory, coupled to the processing device and having software instruction stored thereon that, when executed by the processing device, cause the processing device to perform operations. The operations can include receiving an indication of a start of a transaction between a first user account and a second user account of a collaboration platform, and responsive to the indication, generating, by the collaboration platform, a transaction start entry in a secure ledger, the transaction start entry including a hash value and a previous entry hash value associated with a previous entry in the secure ledger, and the transaction start entry including a first user account identifier associated with the first user account and a second user account identifier associated with the second user account. The operations can also include receiving a first identifier of a first virtual item to be transferred from the first user account to the second user account within the collaboration platform as a first part of the transaction, and receiving a second identifier of a second virtual item to be transferred from the second user account to the first user account within the collaboration platform as a second part of the transaction.

The operations can further include performing the transaction by generating a plurality of entries in the secure ledger to record the first part of the transaction and the second part of the transaction, wherein each entry in the secure ledger is linked to a preceding entry in the secure ledger using one or more hash values and includes one of the first identifier or the second identifier, and creating a transaction resolved entry in the secure ledger indicating that the transaction has been resolved.

The operations can also include receiving a claim from the first user account to dispute the transaction, responsive to the claim, performing a transaction verification operation, and, when a result of the transaction verification operation indicates that the transaction was not resolved according to a transaction in progress entry in the secure ledger, performing an account restore operation based on the secure ledger that retrieves the first virtual item from another user account identified as a last entry in the secure ledger having possession of the first virtual item and restores the first virtual item to the first user account.

In some implementations, the first identifier of the first virtual item comprises a unique identifier that identifies the first virtual item. In some implementations, the second identifier of the second virtual item comprises a unique identifier that identifies the second virtual item. The operations can also include generating one or more additional entries in the secure ledger based on the account restore operation, wherein the one or more additional entries record one or more additional transactions to transfer the first virtual item from the user account identified as the last entry in the secure ledger to the first user account.

The operations can further include responsive to performing the account restore operation, performing a punitive operation on the second user account. In some implementations, the punitive operation include includes one of suspending the second user account, terminating the second user account, or suspending a particular function of the second user account while maintaining an ability to execute other functions of the second user account.

Some implementations can include a non-transitory computer readable medium comprising software instructions that, when executed by a processing device, cause the processing device to perform operations. The operations can include receiving an indication of a start of a transaction between a first user account and a second user account of a collaboration platform, and responsive to the indication, generating, by the collaboration platform, a transaction start entry in a secure ledger, the transaction start entry including a hash value and a previous entry hash value associated with a previous entry in the secure ledger, and the transaction start entry including a first user account identifier associated with the first user account and a second user account identifier associated with the second user account.

The operations can also include receiving a first identifier of a first virtual item to be transferred from the first user account to the second user account within the collaboration platform as a first part of the transaction, and receiving a second identifier of a second virtual item to be transferred from the second user account to the first user account within the collaboration platform as a second part of the transaction.

The operations can further include performing the transaction by generating a plurality of entries in the secure ledger to record the first part of the transaction and the second part of the transaction, wherein each entry in the secure ledger is linked to a preceding entry in the secure ledger using one or more hash values and includes one of the first identifier or the second identifier, and creating a transaction resolved entry in the secure ledger indicating that the transaction has been resolved.

The operations can further include receiving a claim from the first user account to dispute the transaction, responsive to the claim, performing a transaction verification operation, and when a result of the transaction verification operation indicates that the transaction was not resolved according to a transaction in progress entry in the secure ledger, performing an account restore operation based on the secure ledger that retrieves the first virtual item from another user account identified as a last entry in the secure ledger having possession of the first virtual item and restores the first virtual item to the first user account. In some implementations, the first identifier of the first virtual item comprises a unique identifier that identifies the first virtual item and the second identifier of the second virtual item comprises a unique identifier that identifies the second virtual item. In some implementations, the collaboration platform is a virtual game platform, and wherein the first virtual item is a virtual game item.

BRIEF DESCRIPTION OF THE DRAWINGS

Various implementations of the disclosure will be understood more fully from the detailed description given below and from the accompanying drawings of various implementations of the disclosure.

FIG. 6 is a diagram of an example sequence of transaction records in a secure ledger in accordance with some implementations.

DETAILED DESCRIPTION

Figure 1:
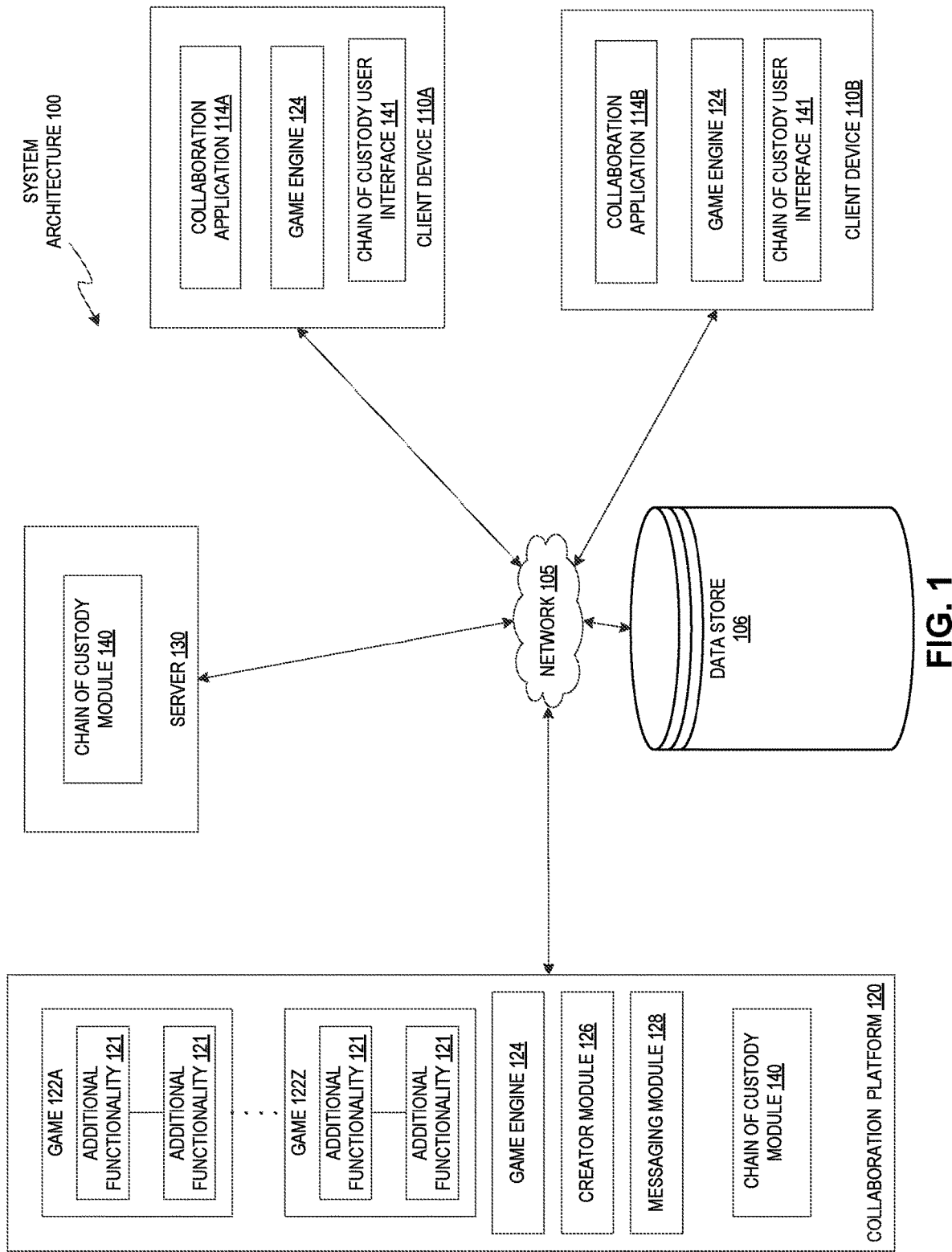
FIG. 1 illustrates an example system architecture, in accordance with implementations of the disclosure.

Collaboration platforms, such as gaming platforms, offer a variety of ways for users to interact with one another. For example, users of a gaming platform may work together towards a common goal, share various virtual gaming items, send electronic messages to one another, and so forth. Users of a collaboration platform may play games (e.g., playing users) with characters or create games (e.g., creating users) with developmental tools via the collaboration platform. In a collaboration platform, users may transact (e.g., buy, sell, or trade) virtual game items (e.g., a virtual tool for use in a virtual gaming environment) with other users of the collaboration platform as part of gameplay or otherwise.

Transactions of virtual game items performed on a collaboration platform between users may have particular challenges. For example, a gaming platform may be a low-trust environment. User accounts may be created with little to no verification or authentication (e.g., the user accounts may not be verified by a telephone number or email address). The identity of users may be unknown, and users may interact with one another on the gaming platform anonymously. Transactions of virtual game items in the low-trust environment may be based on "handshake" agreements, rather than transactions that are validated or facilitated by a third party (e.g., held in escrow until the transaction is validated). In such "handshake" transactions, one user may promise to trade with another user a virtual game item in exchange for another virtual game item, for example. If one party (e.g., offending party) does not deliver on the promise, the injured party may dispute the transaction and ask for damages (e.g., ask for the return of the transferred virtual game item). However, without an electronic record of the transactions of virtual game items, the gaming platform may not be able to verify whether the transaction was completed successfully or return the disputed virtual game item and make the injured party whole, if the transaction was not completed successfully. In some situations, the offending party may further attempt to obfuscate the disputed virtual game item. For example, the offending party may "launder" the disputed virtual game item through multiple "shell" user accounts of the gaming platform making recovery of the virtual game item particularly challenging. In another example, the offending party may act maliciously and destroy or delete the virtual game item from the gaming platform.

In some conventional systems, a simple record of the transactions (e.g., a record that is not cryptographically secure) of virtual game items may be used to determine a transaction history of a virtual game item and return a virtual game item to an injured party. However, a simple record of transactions of virtual game items has additional challenges. For example, a record of transactions may be incomplete and unable to effectively trace the transaction history of a virtual game item. In another example, a record of transactions may be manipulated by one or more "bad actors" so that the authority of the record of transactions is compromised. A compromised record of transactions cannot be used as a definitive source or truth, and as such is unreliable to remedy a disputed transaction.

Aspects of the disclosure address the above-mentioned and other challenges by creating a secure chain of custody of a virtual game item (or other virtual item) in a gaming platform by generating entries in secure ledger that records the transactions of the virtual game item between user accounts in the gaming platform. Chain of custody may refer to a chronological record of custody, control, and transfer of an item. A chain of custody may be implemented using a ledger. A ledger may refer to a secure electronic record of transactions of one or more items, such as virtual game items, where each successive entry of the ledger is linked to a preceding entry using a hash value and the entries include an identification of the user accounts involved in the transaction.

In some implementations, each entry of the ledger may be associated with a particular transaction of the virtual game item. An entry of the ledger may include transaction data that is indicative of or specific to the particular transaction of a virtual game item. The transaction data may be used as input to a hashing function to generate a hash value for the particular entry.

In a subsequent transaction of the virtual game item, a new entry in the ledger may be created that is linked with the immediately preceding entry. For example, the transaction data of the new entry may include a hash value that depends on the hash values of all preceding entries. The transaction data of the new entry that depends on the hash value of all preceding entries may be used as an input to the same hashing function to generate a hash value for the new entry. By linking each successive entry of the ledger using a hash value of a preceding entry, the ability to manipulate the entries in the ledger becomes difficult, if not effectively impossible.

A transaction can include two or more sub-transactions in which a first user agrees to transfer a first item to a second user who agrees to transfer a second item to the first user in return. In some implementations, where one party (e.g., offending party) does not deliver on a promise associated with a transaction of a virtual game item, the injured party may dispute the transaction by submitting a claim to dispute the transaction with the offending party. A validation operation(s) may be performed, using the secure ledger, to determine the legitimacy of claim by the injured party. In some implementations where the claim is determined to be valid, an account restore operation may be performed to restore the user account disputing the transaction to a state that appears as if the disputed transaction had never occurred.

Accordingly, aspects of the disclosure generate an authoritative chain of custody for a virtual game item and perform account restore operations that return a disputed virtual game item to an injured party. Generating an authoritative chain of custody of a virtual game item in a gaming platform using a secure ledger addresses security challenges of electronic records in a collaboration platform, such as a gaming platform. In particular, the aforementioned addresses security challenges of electronic records for transactions of virtual game items in a gaming platform. Generating an authoritative chain of custody of a virtual game item improves the technological process of generating a record of transactions for virtual game items by generating a secure ledger protected against tampering by malicious entities. The secure ledger also improves operation of a computer or computer network by reducing or eliminating additional security measures used to protect ledger from tampering. Additionally, the secure ledger recording the transactions of virtual game items may be used to restore user accounts affected by improper transactions. Using the secure ledger improves the technical process of restoring accounts at least because using a secure ledger reduces the operations in determining whether to return the virtual game item to the injured party (e.g., reduces additional audit operations to verify the authenticity of the ledger), and expedites the process of locating the disputed virtual game item in the collaboration platform and returning the disputed virtual game item to the injured party. Additionally, using the secure ledger to perform account restore operations improves the operation of a computer or computer network by reducing the computation (e.g., processing) resources used to determine whether to return the virtual game item to the injured party and to locate the disputed virtual game item.

It may be noted that a collaboration platform described as a gaming platform herein is provided for purposes of illustration, rather than limitation. A collaboration platform may be one or more of numerous platforms, such as a gaming platform, a social networking platform, purchasing platform, a messaging platform, creation platform, and so forth. It may be further noted that aspects of the disclosure are illustrated using an example of a gaming platform and games for purposes of illustration, rather than limitation.

FIG. 1 illustrates an example system architecture 100, in accordance with one implementation of the disclosure. The system architecture 100 (also referred to as "system" herein) includes client devices 110A and 110B (generally referred to as "client device(s) 110" herein), a network 105, a data store 106, a collaboration platform 120, and a server 130.

In one implementation, network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

In implementations, the server 130 may be one or more computing devices (e.g., a rackmount server, a server computer, etc.). In implementations, the server 130 may be included in the collaboration platform 120, be an independent system, or be part of another system or platform. The server 130 may include chain of custody module 140.

In some implementations, the collaboration platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to collaboration platform 120. The collaboration platform 120 may also include a website (e.g., a webpage) or application back-end software that may be used to provide a user with access to content provided by collaboration platform 120. For example, users may access collaboration platform 120 using collaboration application 114 on client devices 110. It may be noted that collaboration application 114A and 114B may generally referred to as collaboration application(s) 114. In some implementations, collaboration application 114 may be two instances of the same application.

In implementations, collaboration platform 120 may be a type of social network providing connections between users. In implementations of the disclosure, a "user" may be represented as a single individual. However, other implementations of the disclosure encompass a "user" being an entity controlled by a set of users and/or an automated source. For example, a set of individual users federated as a community in a social network may be considered a "user."

In one implementation, collaboration platform 120 may be a gaming platform, such as an online gaming platform or virtual gaming platform. For example, the gaming platform may provide single-player or multi-player games to a community of users that may access or interact with the games 122A-122Z using client devices 110 via network 105. In implementations, games 122 (also referred to as "video game," "online game," or "virtual game" herein) may be two-dimensional (2D) games, three-dimensional (3D) games, virtual reality (VR) games, or augmented reality (AR) games, for example. In implementations, a game 122 may be played in real-time with other users of the game 122.

In some implementations, a game 122 can include an electronic file that can be executed or loaded using software, firmware or hardware configured to present the game content (e.g., digital media item) to an entity. In some implementations, a game 122 may be executed by a game engine 124 to generate a gaming video including multiple frames and audio. The gaming video may be generated (e.g., rendered) by the game engine 124 based on commands or user input. In some implementations, a game engine 124 (e.g., a rendering engine of the game engine 124) receives user input and generates a gaming video based on the user input. In some implementations, a game engine 124 (either local to the client device 110 or at collaboration platform 120) receives user input and generates commands (e.g., rendering commands, graphics library commands, etc.) based on the user input. In some implementations, a game engine 124 (e.g., a rendering engine of the game engine 124) receives from collaboration platform 120 the generated commands and generates the gaming video based on the generated commands. The gaming video may be displayed via a user interface of a client device 110.

In some implementations, collaboration platform 120 hosts games 122 and allows users to interact with the games 122 using collaboration application 114 of client devices 110. Users of collaboration platform 120 may play, create, interact with, or build games 122, or create and build objects (e.g., also referred to as "item(s)" or "game objects" or "virtual game item(s)" herein) of games 122. For example, in generating user-generated virtual items, users may create characters, decoration for the characters, one or more virtual environments for an interactive game, or build structures used in a game 122, among others. In implementations, users may buy, sell, or trade game virtual game objects, such as in-platform currency (e.g., virtual currency), with other users of the collaboration platform 120. In implementations, collaboration platform may transmit game content to collaboration applications 114. Game content (also referred to as "content" herein) may refer to any data or software instructions (e.g., game objects, game, user information, video, images, commands, media item, etc.) associated with collaboration platform 120 or collaboration applications 114.

It may be noted that collaboration platform 120 hosting games 122, is provided for purposes of illustration, rather than limitation. In some implementations, collaboration platform 120 may host one or more media items. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In implementations, a media item may be an electronic file that can be executed or loaded using software, firmware or hardware configured to present the digital media item to an entity.

In one implementation, collaboration platform 120 may consolidate the game content from the client devices 110 and transmit the consolidated game content (e.g., gaming video, rendering commands, user input, graphics library commands, etc.) to each of the client devices 110 to display interactions of the multiple users in a multi-player gaming environment. In another implementation, collaboration platform 120 may transmit the game content from one or more client devices 110 to another client device for the other client device to consolidate and display the game content. In another implementation, the collaboration platform 120 may receive the game content (e.g., first user transmitting user input via client device 110A and second user transmitting user input via client device 110B), generate game results (e.g., first user beats second user), and transmit the game results to the client devices 110.

In some implementations, a game 122 may be associated with a particular user or particular group of users (e.g., a private game), or made widely available to users of the collaboration platform 120 (e.g., a public game). In implementations, where collaboration platform 120 associates one or more games 122 with a specific user or group of users, collaboration platform 120 may associated the specific user(s) with a game 122 using user account information (e.g., a user account identifier such as username and password).

In some implementations, collaboration platform 120 may include a game engine 124. In implementations, game engine 124 may be used for the development or execution of games 122. For example, game engine 124 may include a rendering engine ("renderer") for 2D, 3D, VR, or AR graphics, a physics engine or collision detection (and collision response), sound, scripting, animation, artificial intelligence, networking, streaming, memory management, threading, localization support, scene graph, or video support for cinematics, among other features. In some implementations, an instance of game engine 124 may be included on client devices 110. In some implementations, game engine 124 of client devices 110 may work independently, in collaboration with game engine 124 of collaboration platform 120, or a combination of both.

In implementations, collaboration platform 120 may include a creator module 126. In implementations, creator module 126 may allow users to become creators to design or create environments in an existing game 122 or create new games or create new game objects within games or environments. In some implementations, a game 122 may have a common set of rules or common goal, and the environments of a game 122 share the common set of rules or common goal. In implementations, different games may have different rules or goals from one another. In some implementations, games may have one or more environments (also referred to as "gaming environments" or "virtual environment" herein) where multiple environments may be linked. For example, a user may build a virtual environment that is linked to another virtual environment created by another user. A character of the virtual game may cross the virtual border to enter the adjacent virtual environment. In implementations, game objects (e.g., also referred to as "item(s)" or "objects" or "virtual game item(s)" herein) may refer to objects that are used, created, shared or otherwise depicted in games 122 of the collaboration platform 120. For example, game objects may include a part, model, character, tools, weapons, clothing, buildings, vehicles, currency, flora, fauna, components of the aforementioned (e.g., windows of a building), and so forth.

In implementations, creator module 126 may allow a user to create, modify, or customize characters. In implementations, characters (or game objects generally) are constructed from components, one or more of which may be selected by the user, that automatically join together to aid the user in editing. One or more characters (also referred to as an "avatar" or "model" herein) may be associated with a user (also referred to as a "playing user" herein) where the user may control the character to facilitate a user's interaction with the game 122. In implementations, a character may include components such as body parts (e.g., hair, arms, legs, etc.) and accessories (e.g., t-shirt, glasses, decorative images, tools, etc.). In implementations, body parts of characters that are customizable include head type, body part types (arms, legs, torso, and hands), face types, hair types, and skin types, among others. In implementations, the accessories that are customizable include clothing (e.g., shirts, pants, hats, shoes, glasses, etc.), weapons, or other tools. In implementations, the user may also control the scale (e.g., height, width, or depth) of a character or the scale of components of a character. In implementations, the user may control the proportions of a character (e.g., blocky, anatomical, etc.).

In some implementations, a component, such as a body part, may be a primitive geometrical shape such as a block, a cylinder, a sphere, etc., or some other primitive shape such as a wedge, a torus, a tube, a channel, etc. In implementations, creator module 126 may publish a user's character for view or use by other users of collaboration platform 120. It some implementations, creating, modifying, or customizing characters, other game objects, games 122, or game environments may be performed by a user using a user interface (e.g., developer interface) and with or without scripting (or without an application programming interface (API)). It may be noted that for purposes of illustration, rather than limitation, characters are described as having a humanoid form. In may further be noted that characters may have any form such as a vehicle, animal, inanimate object, or other creative form.

In implementations, collaboration platform 120 may store characters created by users in data store 106. In implementations, the collaboration platform 120 maintains a character catalog and game catalog that may be presented to users via collaboration application 114. A user may select a game 122 from the game catalog to play. In implementations, the game catalog includes images of games stored on collaboration platform 120. In addition, a user may select a character (created by the playing user or other user) from the character catalog to participate in the chosen game. The character catalog includes images of characters stored on the collaboration platform 120. In implementations, one or more of the characters in the character catalog may have been created or customized by the user. In implementations, the chosen character may have character settings defining one or more of the components of the character.

In implementations, a user's character includes a configuration of components, where the configuration and appearance of components and more generally the appearance of the character may be defined by character settings. In implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by collaboration platform 120.

In implementations, creator module 126 includes a unique personal build and publishing service for creating and administering games 122 and gaming environments on the Internet that allows users (also referred to as "creating users," "creators," "owners," or "owning users" herein) to create, own, or administrate games 122 and gaming environments using cloud-mediated computational resources, for example. In implementations, creator module 126 may use a user interface (also referred a "developer interface" herein) via collaboration application 114 to allow users access the functionality of creator module 126. In implementations, the developer interface may be part of collaboration application 114. For example, a developer interface of collaboration application 114 may allow a user access to a library of game objects that may be selected by the user to build a game environment or place game objects within a game 122 or environment. The user may publish their selected game objects via the developer interface so that the game objects are available to playing users of the game 122 or environment.

In implementations, collaboration platform 120 executing creator module 126 includes a user-interfacing website or application (e.g., collaboration application 114) where users may access online computational resources hosted by collaboration platform 120 for the purposes of building, administrating, editing, and interacting with personally owned games 122 or gaming environments. In implementations, creator module 126 includes tools available to users for creating and instantiating three-dimensional virtual games or environments. In implementations, creator module 126 is available to users that wish to create and administer their own private virtual game 122. In implementations, a user may access creator module 126 using collaboration application 114.

In implementations, creator module 126 may provide control of created games 122 and environments to owning users who may set administrative policy regarding who will be allowed to interact with the created game 122 or environment and who has the capability of modifying, editing, or interacting with the game 122 or environment. Users with administrative control may also be referred to as owning users herein, unless otherwise specified. In some implementations, administrative rules can be granular to the point of specifying various levels of interaction, modification, or editing capabilities for certain individuals who might be recruited or otherwise desire to interact with the game 122 or gaming environment. For example, individuals may be recruited from friends in collaboration platform 120 or friends from social networks or in other collaborative or group associated online venues. In implementations, creator module 126 has administrative tools for setting such policies including or in addition to general rules for interaction within the game 122 or gaming environment.

In implementations, the client devices 110A through 110B may each include computing devices such as personal computers (PCs), mobile devices (e.g., laptops, mobile phones, smart phones, tablet computers, or netbook computers), network-connected televisions, gaming consoles, etc. In some implementations, client devices 110A through 110B may also be referred to as "user devices." In implementations, one or more client devices 110 via collaboration application 114 may connect to collaboration platform 120 at any given moment.

In implementations, each client device 110 may include an instance of collaboration application 114. In one implementation, the collaboration application 114 may be an application that allows users to use and interact with collaboration platform 120, such as control a virtual character in a virtual game hosted by collaboration platform 120, or view or upload content, such as images, video items, web pages, documents, and so forth. In one example, the collaboration application 114 may be a web application (e.g., an application that operates in conjunction with a web browser) that can access, retrieve, present, and/or navigate content (e.g., virtual character in a virtual environment, etc.) served by a web server. In another example, collaboration application 114 may be a native application. The collaboration application 114 may render, display, and/or present the content (e.g., a web page, a media viewer) to a user. In an implementation, the collaboration application 114 may also include an embedded media player (e.g., a Flash® player) that is embedded in a web page. In another example, the collaboration application 114 may be a standalone application (e.g., a mobile application, app, or a gaming program) that allows users to interact with collaboration platform 120. According to aspects of the disclosure, the collaboration application 114 may be a collaboration platform application for users to build, create, edit, upload content to the collaboration platform 120 as well as interact with collaboration platform 120. As such, the collaboration applications 114 may be provided to the client devices 110A and 110B by the server 130 or collaboration platform 120. In another example, the collaboration applications 114 may be applications that are downloaded from the server 130. In some implementations, collaboration application 114 of client device 110 may include game engine 124. In some implementations, game engine 124 of client device 110 may be separate from collaboration application 114A.

In implementations, a user may login to collaboration platform 120 via collaboration application 114. The user may access a user account by providing user account information (e.g., username and password) where the user account is associated with one or more characters available to participate in one or more games 122 of collaboration platform 120.

In general, functions described in one implementation as being performed by the collaboration platform 120 can also be performed on the client devices 110A through 110B, or server 130, in other implementations if appropriate. In addition, the functionality attributed to a particular component can be performed by different or multiple components operating together. The collaboration platform 120 can also be accessed as a service provided to other systems or devices through appropriate application programming interfaces, and thus is not limited to use in websites.

In implementations, collaboration platform 120 may include messaging module 128. In implementations, messaging module 128 may be a system, application, or module that allows users to exchange electronic messages via a communication system, such as network 105. Messaging module 128 may be associated with collaboration application 114 (e.g., module of collaboration application 114 or be a separate application). In implementations, users may interface with messaging module 128 and exchange electronic messages among users of collaboration platform 120. Messaging module 128 may be, for example, an instant messaging application, a text messaging application, an email application, a voice messaging application, a video messaging application, or a combination of multiple applications, among others.

In implementations, messaging module 128 may facilitate the exchange of electronic messages between users. For example, a user may be logged into a messaging application on client device 110A, and another user may be logged into a messaging application on client device 110B. The two users may start a conversation, such as an instant messaging conversation. Messaging module 128 may help facilitate the messaging conversation by sending and receiving the electronic messages between the users of collaboration platform 120.

For the sake of illustration, rather than limitation, chain of custody module 140 is described as implemented on collaboration platform 120. In other implementations, chain of custody module 140 may in part or wholly be implemented on client device 110. In other implementations, chain of custody module 140 may in part or wholly be implemented on server 130. In other implementations, chain of custody module 140 operating on one or more of client device 110, server 130, or collaboration platform 120 may work in conjunction to perform the operations described herein. Although implementations of the disclosure are discussed in terms of collaboration platforms, implementations may also be generally applied to any type of social network providing connections between users. The chain of custody module 140 may help facilitate the operation described herein, such as operation described with respect to FIG. 2 and FIG. 3. For example, the chain of custody module 140 may help facilitate transactions of virtual game items, record the transactions in a ledger, and perform account restore operations.

In implementations, chain of custody user interface 141 may allow a user to interface with chain of custody module 140 of collaboration platform 120. In implementations, chain of custody user interface 141 of client devices 110 may be a separate application or part of collaboration application 114 (e.g., add-in). The chain of custody user interface 141 may allow users of the collaboration platform 120 to view the chain of custody of one or more virtual game items. In some implementations, users using the chain of custody user interface 141 may be able to view the chain of custody (e.g. ledger) but may not be able to directly modify or change or edit the ledger.

In situations in which the systems discussed here collect personal information about users, or may make use of personal information, the users may be provided with an opportunity to control whether the collaboration platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the collaboration platform 120.

Figure 2:
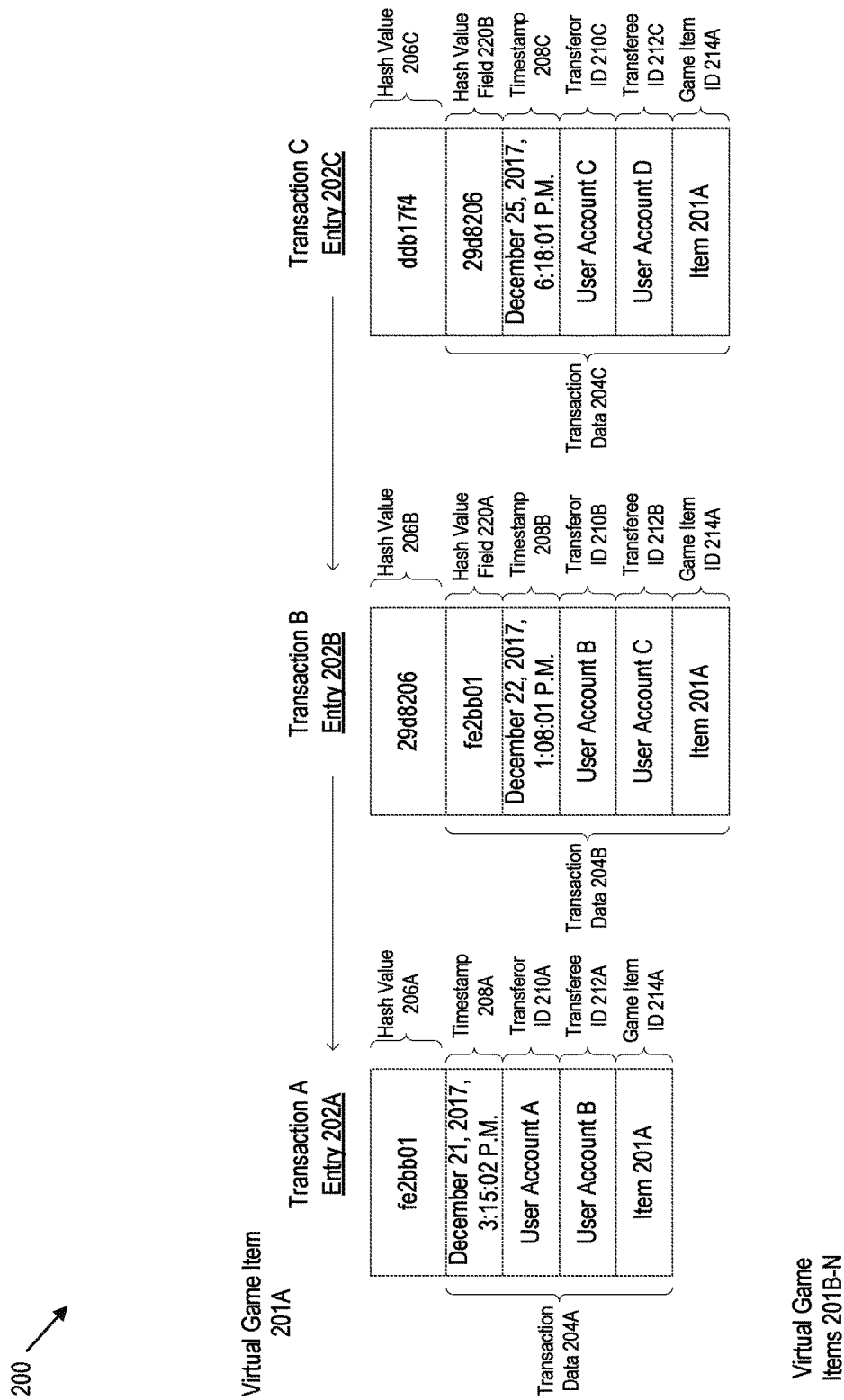
FIG. 2 illustrates a secure ledger used in a collaboration platform, in accordance with implementations of the disclosure.

FIG. 2 illustrates a ledger used in a collaboration platform, in accordance with implementations of the disclosure. In implementations, ledger 200 may be part of collaboration platform 120 and stored on data store 106. In implementations, chain of custody module 140 of collaboration platform 120 may generate ledger 200 and the contents therein. In some implementations, contents of the ledger 200 may be made available to users for viewing via chain of custody user interface 141 of client device 110. It may be noted that elements of FIG. 1 may be used to help describe FIG. 2.

In some implementations, the chain of custody of one or more virtual game item is recorded in ledger 200. Virtual game items may include characters, character decorations (e.g., hats, shirts), and so forth. In some implementations, the virtual game items may be user-generated virtual items. In some implementations, the virtual game item may be non-user-generated virtual items. In some implementations, ledger 200 may implement block chain techniques to add a level of security to the ledger 200, which prevents fraudulent manipulation of the ledger by bad actors and creates an authoritative source of truth for transactions of virtual game items. As an authoritative source of truth, ledger 200 may be used to record and track the transaction history of virtual game items in the collaboration platform 120, as well as to determine the validity of claims that dispute transactions and to remedy disputed transactions.

For example, ledger 200 may be used to "roll-back" a fraudulent transaction by validating a claim of a disputed transaction and identifying a current location of the transacted virtual game item The ledger 200 may be used by chain of custody module 140 to help return the virtual game item to the user account of the injured party (e.g., user account of transferor of the disputed transaction) and restore the one or more affected user accounts (e.g., the user account of the transferor of the disputed transaction, the user account where the virtual game item is currently located, and any affected intermediary user accounts through which the virtual game item was transacted between the user account of the transferor and the user account where the virtual game item is currently located) to a state that appears as if the fraudulent transaction had never occurred.

Ledger 200 shows several entries 202A-202C (generally referred to as "entry 202" or "entries 202" herein) associated with virtual game item 201A. Each entry 202 represents a transaction of virtual game item 201A. For purposes of illustration, rather than limitation, ledger 200 shows three entries 202 associated with virtual game item 201A. It may be noted the any number of entries may exist for a particular virtual game item. It may be further noted that ledger may include entries for one or more virtual game items (e.g., virtual game items 201B through 201N).

In some implementations, the entries 202 of ledger 200 may be ordered chronologically. For example, transaction A associated with entry 202A may be the first transaction of virtual game item 201A (e.g., genesis). Transaction B associated with entry 202B may be the second transaction of virtual game item 201B and occur after transaction A. Transaction C associated with entry 202C may be the third transaction of virtual game item 201C and occur after transaction B.

In some implementations, each entry 202 of the ledger may be associated with transaction data 204. Transaction data 204 includes data that is indicative of or specific to the particular transaction of a virtual game item. In implementations, the data of transaction data 204 includes various fields, each of which may include a value specific to the particular transaction.

For example, transaction data 204A includes the fields of timestamp 208A, transferor identifier 210A, transferee identifier 212A, and virtual game identifier 214A. The field timestamp 208 may be indicative of the time and date of a transaction of virtual game item 201A. Timestamp 208A has a value of Dec. 21, 2017 at 3:15:02 P.M. The field transferor identifier 210 may be indicative of the party (e.g., user account) that initiated the transfer of the virtual game item 201A. Transferor identifier 210A has a value indicating the transferor is user account A. The field transferee identifier 212 may be indicative of the party (e.g., user account) to which the transferor transferred the virtual game item 201A. Transferee identifier 212A has a value indicating the transferee is user account B. The field virtual game identifier 214 may be indicative of the virtual game item that was transferred in a transaction. Virtual game identifier 214A has a value indicative of virtual game item 201A. In some implementations, the virtual game item 201A may have a unique identifier that uniquely identifies the virtual game item from other virtual game items of collaboration platform 120. It may be noted that in other implementations, transaction data 204 may include the same or different fields.

In implementations, each entry 202 may include a hash value 206 (hash value 206A-C are generally referred to as "hash value(s) 206" herein). A hash value 206 of each entry may be unique to each entry and uniquely identify each entry. In implementations, hash values may be generated using input that includes one or more values of the associated transaction data 204. For example, hash value 206A ("fe2bb01") of entry 202A may be a hash value generated using one or more of the values illustrated in the fields of timestamp 208A, transferor identifier 210A, transferee identifier 212A, or virtual game identifier 214A.

In implementations, each entry 202 subsequent the first entry (e.g., entry 202A) is linked to the immediately preceding entry 202 (e.g., chronologically preceding transaction). For example, entry 202B of transaction B is linked to entry 202A of transaction A, and entry 202C of transaction C is linked to entry 202B of transaction B, as illustrated by the arrows in FIG. 2. The entries 202 are linked to one another in a chain-like fashion by using the hash value 206 of the preceding entry in the calculation of the of the hash value 206 of the current entry 202. For example, transaction data 204B of entry 202B includes an additional field, hash value 220A. The value of the field hash value 220A is the hash value 206A ("fe2bb01") of the preceding entry 202A. Hash value 206B of entry 202B may be calculated using the hash value of the preceding entry 202A (e.g., "fe2bb01") and one or more additional values of transaction data 204B.

In implementations, using the hash value of the preceding entry to calculate the hash value of the current entry guarantees within technological or temporal limitations that the entries 202 of the ledger 200 are tamper-proof. If any part of the transaction data 204 (e.g., transaction data 204 used to calculate the hash value 206 of an entry) changes, so does the hash value 206 of the entry 202 to which the hash value 206 is associated, as well as any hash values 206 of subsequent entries 202. Tampering may be determined by comparing the original hash value 206 with the hash values of a tampered ledger 200.

In implementations, the last entry (e.g., entry 202C) of the ledger 200 represents the current state of the virtual game item 201A. The last entry of the ledger 200 may be used to determine the current location (e.g., user account) of the virtual game item 201A. For example, if transaction C is the last transaction of virtual game item 201A, entry 202C indicates that the virtual game item 201A may be found in user account D (e.g., value of transferee identifier 212).

In some implementations, hash value 206 may be an output of a hashing function or algorithm that uses one or more of values of transaction data 204 as input to the hash function. In some implementations, hashing may include taking an input string of any length and processing the input string in a hashing algorithm (e.g., Secure Hash Algorithm (SHA-256)) to produce an output of fixed length (e.g., hash value 206). In implementations, any hashing algorithm may be used, such as a cryptographically secure hashing algorithm. In some implementations, the same hashing algorithm may be used to determine every hash value 206 of the entries 202 of the ledger 200.

In some implementations, every hash value 206 may be determined using the same fields of transaction data 204 as inputs to the hashing algorithm (apart from the genesis entry since a hash value of a previous entry is not available).

For purposes of illustration, rather than limitation, transactions A-C show the transactions of the same virtual game item 201A. In may be noted that in some implementations, the ledger 200 may link the transactions of the same virtual game item separately from transactions of other virtual game items. For example, the transactions of virtual game item 201A may be linked chronologically without other intervening transactions of other virtual game items (e.g., every virtual game item has its own unique chain). In other implementations, the entries of the ledger 200 may record the transactions of multiple virtual game items in chronological order in a single chain. For example, the transactions of multiple virtual game items (e.g., virtual game items 201A-N) are linked in chronological order to form a single chain of entries for ledger 200. In both cases, the hash value (e.g., hash value 206) of an entry 202 uses the hash value from the previous transaction (e.g., immediately preceding in chronological order) in the ledger 200 to generate the new hash value for a particular entry.

Figure 3:
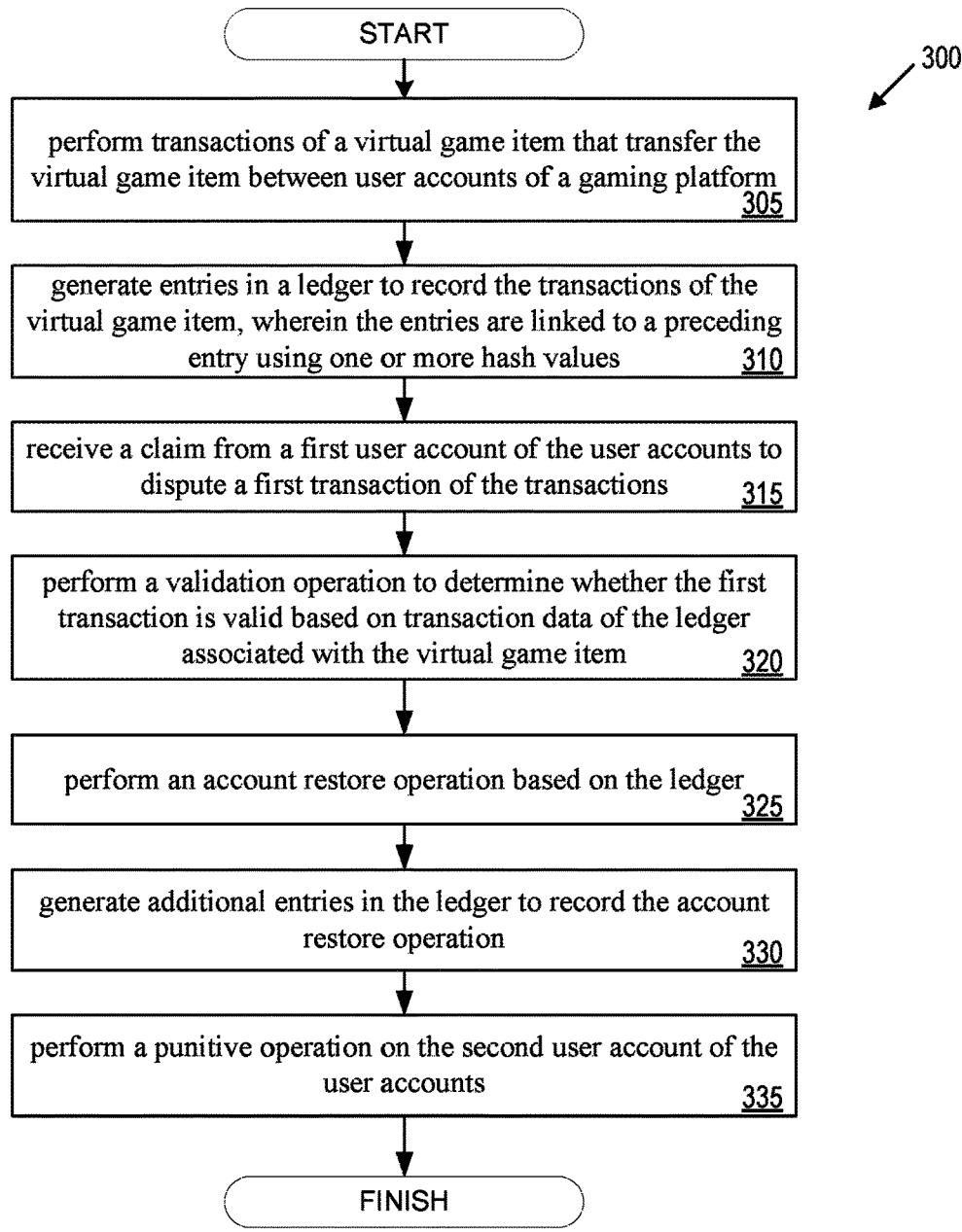
FIG. 3 is a flow diagram illustrating method for creating a secure ledger and use of the ledger in a collaboration platform, in accordance with implementations of the disclosure.

FIG. 3 is a flow diagram illustrating method 300 for creating a secure chain of custody using a ledger and for using the ledger in a collaboration platform, in accordance with implementations of the disclosure. Method 300 may be performed by processing logic that includes hardware (e.g., circuitry, dedicated logic, programmable logic, microcode), software (e.g., instructions run on a processing device to perform hardware simulation), or a combination thereof. In some implementations, chain of custody module 140 executing at collaboration platform 120, client device 110A, client device 110B, server 130 or combination thereof may perform some or all the operations. Elements of FIGS. 1 and 2 may be used to help illustrated method 300. It may be noted that the in some implementations, method 300 may include the same, different, fewer, or greater operations performed in any order.

Method 300 begins at block 305 where processing logic performing method 300 performs one or more transactions of a virtual game item that transfers the virtual game item between user accounts of the collaboration platform 120. At block 310, processing logic generates one or more entries 202 in a ledger 200 to record the one or more transactions of the virtual game item. Each entry 202 may correspond to a particular transaction of the virtual game item. In implementations, the entries 202 of the ledger 200 are linked to a preceding entry using one or more hash values. For example, with respect to transaction B of FIG. 2, entry 202B is linked to the preceding entry 202A by using hash value "fe2bb01" as input to create another hash value 206B that is specific to entry 202B.

In implementations, processing logic may perform a first transaction (e.g., transaction A) of the transactions of the virtual game item that transfers the virtual game item from the first user account (e.g., user account A) to a second user account (e.g., user account B) of the user accounts of a gaming platform. Processing logic may generate a first entry (e.g., entry 202A) of the entries in the ledger 200 that records the first transaction of the virtual game item (e.g., virtual game item 201A). The first entry may include first transaction data (e.g., transaction data 204A) indicative of the first transaction of the virtual game item from the first user account to the second user account and a first hash value (e.g., hash value 206A) of the first transaction data.

Subsequent to generating the first entry of the ledger 200, processing logic may perform a second transaction (e.g., transaction B) of the transactions of the virtual game item that transfers the virtual game item from the second user account (e.g., user account B) to a third user account (user account C) of the gaming platform. Processing logic may generate a second entry (e.g., entry 202B) of the entries in the ledger 200 that records the second transaction (e.g., transaction B) of the virtual game item. The second entry may include second transaction data (e.g., transaction data 204B) indicative of the second transaction of the virtual game item from the second user account to the third user account, the first hash value (e.g., value of the field hash value 220B) of the first transaction data, and a second hash value (e.g., hash value 206B) of the second transaction data and the first hash value. In some implementations, the virtual game item may only exist or be transferred within the collaboration platform 120 and cannot be transferred outside of the collaboration platform 120.

At block 315, processing logic may receive a claim (e.g., user request) from a first user account (e.g., user account A) of the user accounts to dispute a first transaction (e.g., transaction A) of the transactions. For example, collaboration platform 120 may be a low-trust environment. For example, if one party involved in a transaction does not deliver on a promise to deliver, the injured party may dispute the transaction and ask for damages (e.g., ask for the return of the transferred virtual game item). For example, a transaction may include a first user offering to exchange an item (Item A) for an item (Item B) belonging to a second user. If the first user transfers item A to the second user, but the second user does not transfer item B to the first user, then the first user may initiate a claim to have the transferred item A restored to the first user account from the second user. In some implementations, a user may submit a claim (e.g., email or submit an online form) to collaboration platform 120 that disputes the transaction with the offending party (e.g., the user account receiving the virtual game item in the disputed transaction that did not perform the corresponding part of the transaction, such as transferring item B to the first user in the example above) or requests reimbursement.

At block 320, processing logic performs a validation operation to determine whether the claim disputing the first transaction (e.g., transaction A) is valid based on transaction data (transaction data 204A) of the ledger 200 associated with the virtual game item 201A. A validation operation may refer to one or more operations to determine the legitimacy of the claim disputing a transaction of a virtual game item.

In implementations, a validation operation may include one or more operations as described below and in conjunction with FIGS. 7-9. In some implementations, a validation operation may determine whether the user account (e.g., injured party) actually had possession of the virtual game item in dispute at the time of the disputed transaction (e.g., the user account disputing the transaction may have never owned the virtual game item and be submitting a fraudulent claim). In some implementations, the validation operation may verify the disputed transaction of the virtual game item (e.g., that the transaction of the virtual game item actually occurred). In some implementations, the validation operation may further verify whether the disputed transaction was with the claimed offending party (e.g., user account B).

In some implementations, the validation operation may identify a current location of the virtual game item. The ledger 200 may be used to find the current location of the virtual game item, as the last entry of the ledger 200 may identify the current location (e.g., user account of the last transferee). For example, subsequent to the disputed transaction, the virtual game item may be transferred to one or more additional user accounts. In some cases, the multiple transfers of a virtual game item may be an attempt to obfuscate, "fence", or "launder" the particular virtual game item. The validation operation may trace or follow the virtual game item through each successive transaction and determine the final transaction (e.g., the last entry of the ledger for the particular virtual game item). In some implementations, if any of the validation operations fail or identify that the claim is not valid, the virtual game item may not be "returned" to the user account disputing the transactions (e.g., the account restore operation in not performed).

In some implementations, the validation operation may include validating one or more of the entries 202 in the ledger 200 for the particular virtual game item 201A. For example, to validate entry 202B (i.e., transaction B) of ledger 200, a message may be created that includes the transaction data 204B (e.g., hash value 206A in previous hash value 220A, timestamp 208B, transferor ID 210B, transferee ID 212B, and game item ID 214A) of entry 202B. In some implementations, the message may combine the transaction data 204B. For example, the combination of transaction data 204B may include concatenating the transaction data 204B in a binary form. In another example, the combination of transaction data 204B may include converting the transaction data 204B into hexadecimal strings and concatenating the hexadecimal strings. In implementations, the validation operation may further include applying the hashing function on the message data to compute a hash value. The hash function may be the same hash function used to compute the original hash value (e.g., hash value 206B) of the entry 202B. In implementations, the computed hash value is compared to the stored hash value (e.g., hash value 206B) for the entry 202B. If the computed hash value matches the stored hash value 206B, entry 202B is valid. If the computed hash value does not match the stored hash value 206B, entry 202B in not valid. In some implementations, the validation operation to validate entries 202 may be applied from the genesis entry (e.g., entry 202A) (or from the disputed transaction) and work forwards (e.g., transaction B, followed by transaction C, etc.) to ensure that all the entries (e.g., entry 202B, 202C) are valid. If any of the entries are invalid, the validation operation fails, and the account restore operation is not performed. If all the entries are valid, the validation operation succeeds, and the account restore operation is performed.

If the claim is determined to be valid using the validation operations, processing logic moves to block 325 and performs an account restore operation based on the ledger 200. An account restore operation may restore the user account disputing the transaction to a state that appears as if the disputed transaction had never occurred. Additionally, the account restore operation may restore any other user accounts to a state that appears as if the disputed transaction had never occurred. For example, if any intermediary user accounts exchanged a virtual game item for the disputed virtual game item, the intermediary user accounts may be restored to a state as if the transaction had never occurred (e.g., return of the exchanged virtual game item). In some implementations, processing logic executing the account restore operation retrieves the virtual game item from another user account identified as a last entry in the ledger and restores the virtual game item to the first user account.

It may be noted that at either block 320 (validation operation) or block 325 (account restore operation) processing logic may suspend any further transactions involving the disputed virtual game item until a resolution of the claim by the injured party.

At block 330, processing logic updates the ledger 200 to account for the one or more account restore operations. In some implementations, updating the ledger 200 includes generating one or more additional entries in the ledger based on the one or more account restore operations. One or more additional entries are generated to record the one or more additional transactions to transfer the virtual game item from the user account identified as the last entry in the ledger to the first user account. For example, the ledger using hash values, as described herein, may have existing entries that cannot be altered or changed. To account for the account restore operations, the ledger is updated to add additional entries that show the additional transactions of the virtual game item, rather than altering or erasing existing entries. The ledger may be updated to add additional entries to account for any additional user accounts affected by the account restore operations.

At block 335, processing logic performs a punitive operation on the second user account. In some implementations, a punitive operation may include suspending a user account, terminating a user account, or eliminating or suspending a particular function of the user account (e.g., eliminating or suspending the ability to transfer the disputed virtual game item or any virtual game items) while maintaining the ability to execute other functions of the user account (e.g., ability to play games, etc.).

Figure 4:
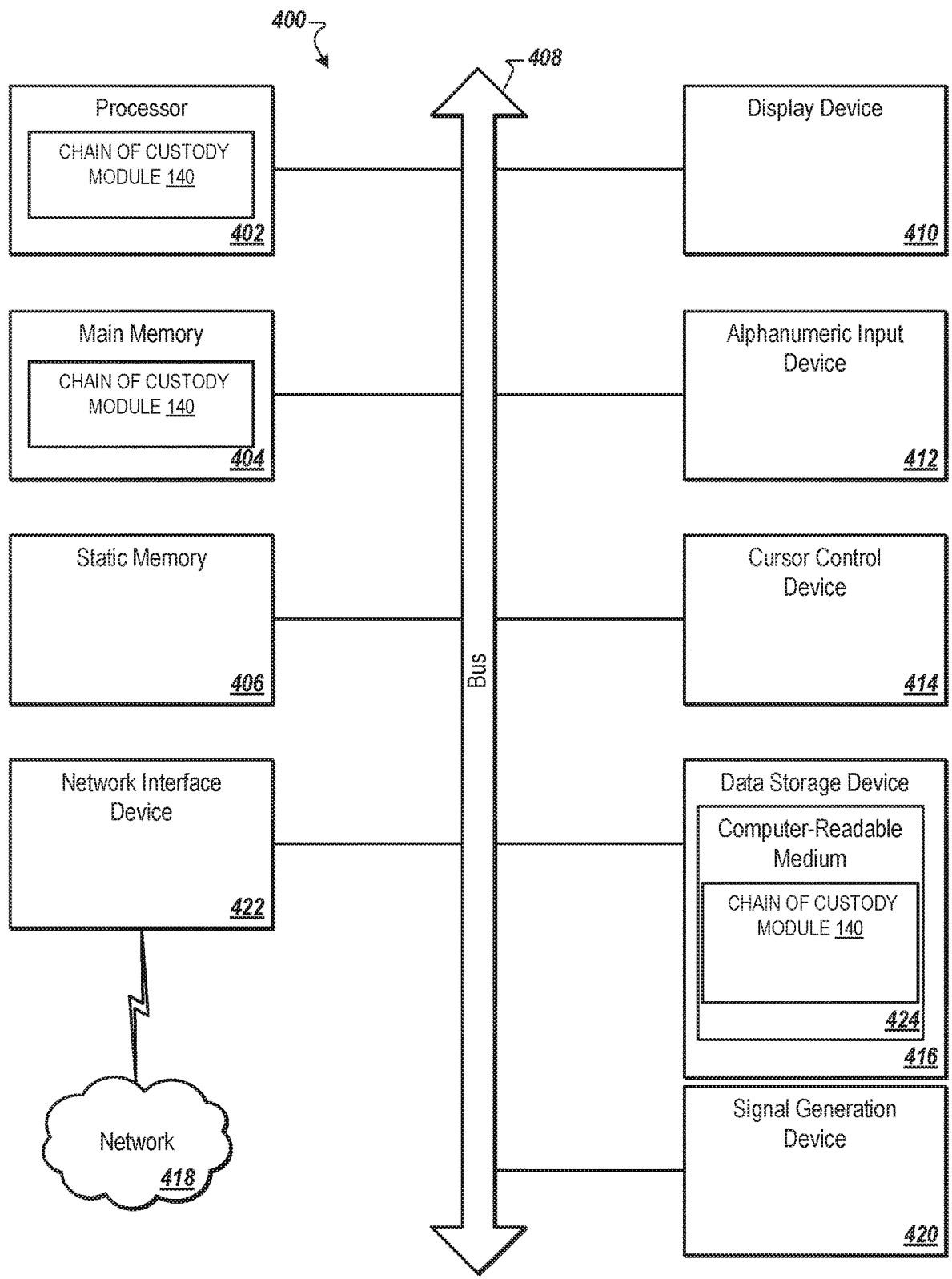
FIG. 4 is a block diagram illustrating an example computer system, in accordance with implementations of the disclosure.

FIG. 4 is a block diagram illustrating an exemplary computer system 400, in accordance with implementations. The computer system 400 executes one or more sets of instructions that cause the machine to perform any one or more of the methodologies discussed herein. Set of instructions, instructions, and the like may refer to instructions that, when executed computer system 400, cause computer system 400 to perform one or more operations of chain of custody module 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute instructions of the system architecture 100 and the chain of custody module 140 for performing the operations discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a non-transitory computer-readable storage medium 424 on which is stored the sets of instructions of the system architecture 100 and chain of custody module 140 embodying any one or more of the methodologies or functions described herein. The sets of instructions of the system architecture 100 and chain of custody module 140 may also reside, completely or at least partially, within the main memory 404 and/or within the processing device 402 during execution thereof by the computer system 400, the main memory 404 and the processing device 402 also constituting computer-readable storage media. The sets of instructions may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

Figure 5:
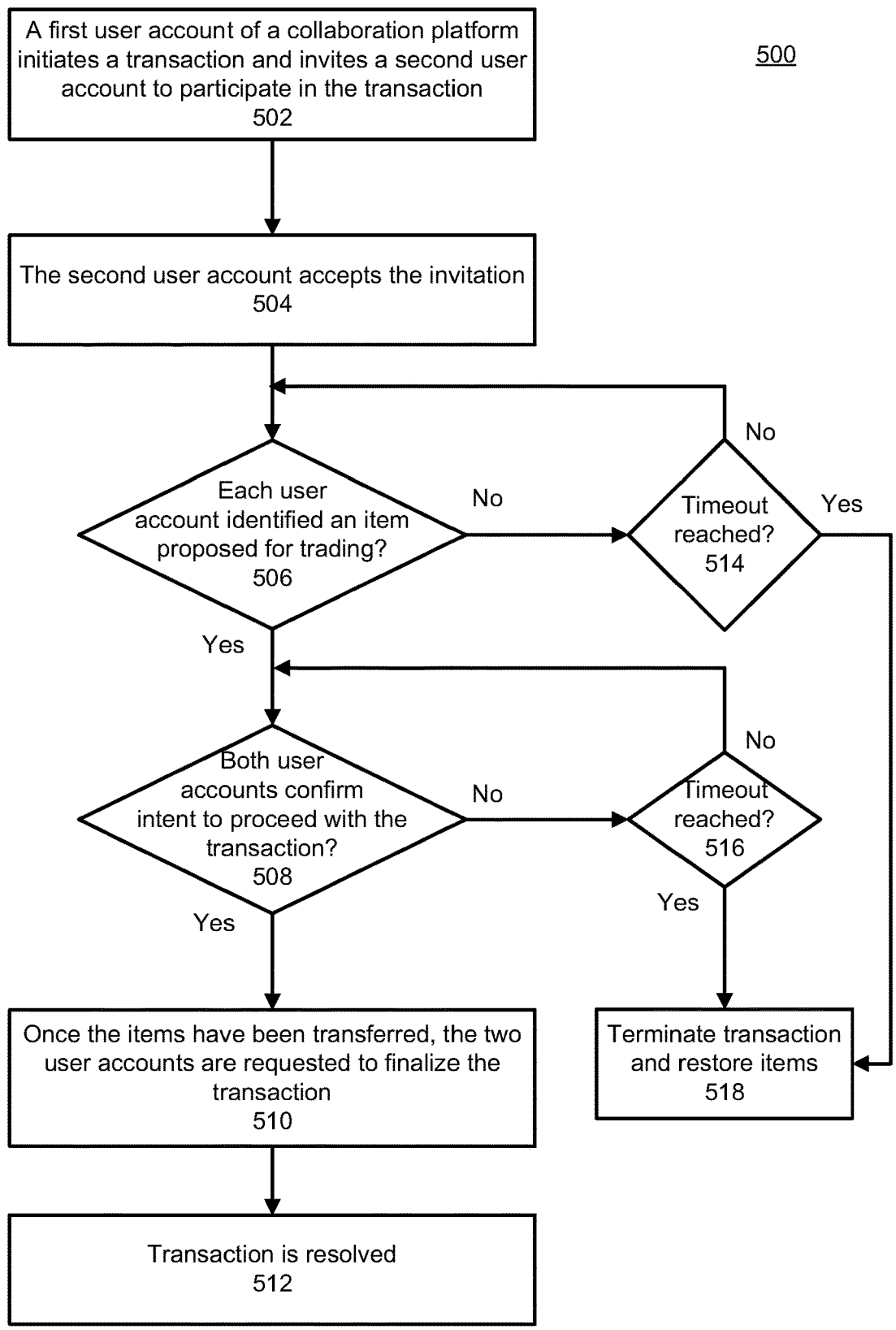
FIG. 5 is a flowchart of an example method to document a transaction in a secure ledger in accordance with some implementations.

FIG. 5 is a flowchart of an example method 500 to transact virtual items in a collaboration platform using a secure ledger in accordance with some implementations. In some implementations, method 500 can be implemented, for example, on a collaboration platform 120 as shown in FIG. 1. In some implementations, some or all of the method 500 can be implemented on one or more client devices 110A or 110B as shown in FIG. 1, one or more server devices, and/or on both server device(s) and client device(s). In described examples, the implementing system includes one or more digital processors or processing circuitry ("processors"), and one or more storage devices (e.g., a data store 106 or other storage). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

In some implementations, the method 500, or portions of the method, can be initiated automatically by a system. In some implementations, the implementing system is a first device. For example, the method (or portions thereof) can be performed based on one or more particular events or conditions, e.g., initiation of a virtual item trade or transaction, and/or one or more other conditions occurring which can be specified in settings read by the method.

Method 500 may begin at block 502, where a first user account of a collaboration platform (e.g., an account associated with client device 110A) initiates a transaction and invites a second user associated with a second user account of the collaboration platform (e.g., associated with client device 110B) to participate in a transaction. Processing continues to 504.

At 504, the second user account optionally accepts the invitation. For example, one of the parties to a contemplated transaction, either User 1 or User 2, initiates the transaction and invites the other party to participate. When the second user accepts the invitation or otherwise indicates a willingness to participate in the transaction, a Start Transaction entry (e.g., 602 in FIG. 6) is created in a secure ledger (as described above) recording the parties and the time of initiation (e.g., a "Trans-Start-1-2" entry). This entry is added to the ledger using the backward hashing reference as the case of simple asset assignments (such as in FIG. 2). User 1, the initiating user (inviter), becomes Trader 1 and User 2, the other party (invitee). becomes Trader 2 in the ledger entry. Processing continues to 506.

At 506, each transacting party identifies the item(s) they propose to exchange. For example, the parties may only select from items they own, per the ledger, and that are not already part of any pending prior transaction or exchange. When an item is selected, a state of the item is modified to indicate the item is part of an on-going transaction or exchange. The state of an item can be stored in a separate database or table that includes items, unique identifiers for items, the current state of items, and other information. The item state information could be in a separate table or other portion of the ledger or could be a standalone database. In this example, the item state modification includes a reference to the ledger entry "Trans-Start-1-2". Each of the parties can see the items proposed by the other party (or parties) in the exchange via a UX mechanism such as a graphical user interface displayed via the client devices. If one or both parties fail to provide any items for the transaction or exchange within a set time period, a transaction resolved entry, in this example "Trans-Resolved-1-2" (e.g., record 614 in FIG. 6), is created in the ledger which notes in the transaction status field that the transaction was not completed and links to the transaction start entry, "Trans-Start-1-2", for the transaction or exchange. Any items marked as being part of an on-going exchange have their state cleared so that these items may then be used in new transactions. If no items are proposed for trading by at least one of the parties, processing continues to block 514; else, processing continues to 508.

At 508, both parties confirm their intent to proceed with the exchange. The first user to confirm that the transaction or exchange is acceptable, either User 1 or User 2, causes a new transaction in progress entry (e.g., entry 604 in FIG. 6) in the ledger which references the Start Transaction entry ("Trans-Start-1-2"), and the list of item(s) from each user. In this example, the transaction in progress entry is "Trans-Prog-1-2" (entry 604 in FIG. 6), When Trader 1 (User 1) confirms the transaction, Item A from Trader 1 (User 1) is assigned in the ledger to "Trans-Prog-1-2", see 606 in FIG. 6. When Trader 2 (User 2) confirms the transaction, Item B from Trader 2 is assigned in the ledger to "Trans-Prog-1-2", see 608 in FIG. 6.

if one or both parties fail to confirm the transaction or exchange is acceptable within a set timeout period (as shown in 516), a transaction resolved entry, in this example "Trans-Resolved-1-2", is created in the ledger which notes the transaction was not completed and links to the transaction start entry for the transaction or exchange. Any items whose ownership was transferred to the transaction in progress entry, "Trans-Prog-1-2", are transferred back to their original owners.

If the parties confirm the transaction within the timeout period, processing continues to 510. Else, processing continues to block 516.

At 510, when the items have been successfully transferred to transaction in progress entry (e.g., 604 in FIG. 6), "Trans-Prog-1-2", User 1 and User 2 are asked to finalize the transaction or exchange. When both User 1 and User 2 have confirmed the transaction or exchange the items are transferred from the transaction in progress entry ("Trans-Start-1-2") to the new owner with the appropriate ledger entries (e.g., 610 and 612, respectively in FIG. 6). In low trust situations, for example, with new traders or traders with a large number of disputed trades, the platform owner may establish a minimum waiting period (e.g., one hour or one day, etc.) before the transfers from the transaction in progress ("Trans-Start-1-2") entry to the final transferee are concluded. Processing continues to 512.

At 512, once all items have been transferred to their new owners, a transaction resolved entry (e.g., 614 in FIG. 6) is created in the ledger which notes the transaction completed successfully and links to the transaction start and the transaction in progress entries for the transaction or exchange. Upon a successful transaction resolved entry in the ledger, items that were transferred are made tradeable again so that the new owner may further trade the item. Outside of the transaction itself, in low trust situations (e.g., transactions with a new user or a user with a threshold number of complaints, etc.), the platform owner may also make newly traded items subject to trade waiting times or other trading limits to deter deliberate exploitation of trades.

At block 514, it is determined if a timeout has been reached without at least one of the parties proposing an item to be traded. If the timeout has not been reached, processing continues to block 506; else, processing continues to block 518.

At block 516, it is determined if a timeout has been reached with at least one of the parties failing to provide confirmation of the intent to proceed with the transaction. If the timeout has not been reached, processing continues to block 508; else, processing continues to block 518.

At block 518, the transaction is terminated. If any items were identified for trade, e.g., when block 518 is performed after block 516, the items are restored to the user account that proposed the items for trade.

FIG. 6 is a diagram of an example sequence of transaction entries in a secure ledger in accordance with some implementations. The example ledger entries shown in FIG. 6 progress sequentially in time entry 602 to entry 614. A given implementation can include more or less entries or fields within entries than shown in FIG. 6. Entry 602 is a transaction start entry and includes a hash value, a previous hash value (e.g., referencing a previous entry in the secure ledger), a timestamp, trader 1 identification, and trader 2 identification. The has value is a hash value of the current entry in the secure ledger and the previous hash value is the hash value from the previous entry in the secure ledger. The hash value and previous hash value permit the secure ledger entries to be chained together. As shown in 602, some implementations can include identification of traders (or users) that participate in a transaction. The identification of participants is a feature that makes account restoration possible and is different that the anonymity provided by some secure ledger systems (e.g., crypto-currency systems, etc.). The timestamp can include a timestamp that the entry was created and can be used, along with timestamps form other records to help establish a timeline and chain of custody for a virtual item by comparing timestamps from records in the secure ledger related to transactions of the item.

Entry 604 is a transaction in progress entry including a hash value, a hash value field (e.g., referencing a previous entry in the secure ledger), a timestamp, trader 1 identification, transaction start entry, trader 1 and item identification (e.g., Item A), and trader 2 and item identification (e.g., Item B). The item identification can include an identification of the type of virtual item (e.g., an item within a virtual game environment) and optionally a serial number or unique identifier of that particular item such that entries related to a particular item can be searched in the secure ledger to perform operations such as transaction validation, dispute resolution, technical error rollbacks, or account restores (returning an item to an original owner as a result of a dispute or claim process). While FIG. 6 shows two traders with one item each offered for trade, it will be understood that the transaction ledger can include more than two parties and/or more than two items in a single entry of the ledger.

Entry 606 is an item transfer entry including a hash value, a previous hash value (e.g., referencing a previous entry in the secure ledger), a timestamp, trader identification (e.g., Trader 1 in this example), entry status (e.g., transaction in progress), item identification (e.g., Item A). Entry 606 indicates a user and item being transferred from that user.

Entry 608 is an item transfer entry including a hash value, a hash value field (e.g., referencing a previous entry in the secure ledger), a timestamp, trader identification (e.g., Trader 2 in this example), entry status (e.g., transaction in progress), item identification (e.g., Item B). Entry 608 indicates a user (User 1) and item (item A) being transferred from that user.

Entry 610 is an item transfer entry including a hash value, a previous hash value (e.g., referencing a previous entry in the secure ledger), a timestamp, trader identification (e.g., Trader 1 in this example), entry status (e.g., transaction in progress), item identification (e.g., Item B). Entry 610 indicates a user and item being received by that user.

Entry 612 is an item transfer entry including a hash value, a previous hash value (e.g., referencing a previous entry in the secure ledger), a timestamp, trader identification (e.g., Trader 2 in this example), entry status (e.g., transaction in progress), item identification (e.g., Item A). Entry 612 indicates a user and item being received by that user.

Entry 614 is a transaction resolved entry including a hash value, a previous hash value (e.g., referencing a previous entry in the secure ledger), a timestamp, a transaction status (e.g., completed, cancelled, timed out, etc.), a transaction start entry index (or hash or other identifier), and a transaction in progress index (or hash or other identifier).

Figure 7:
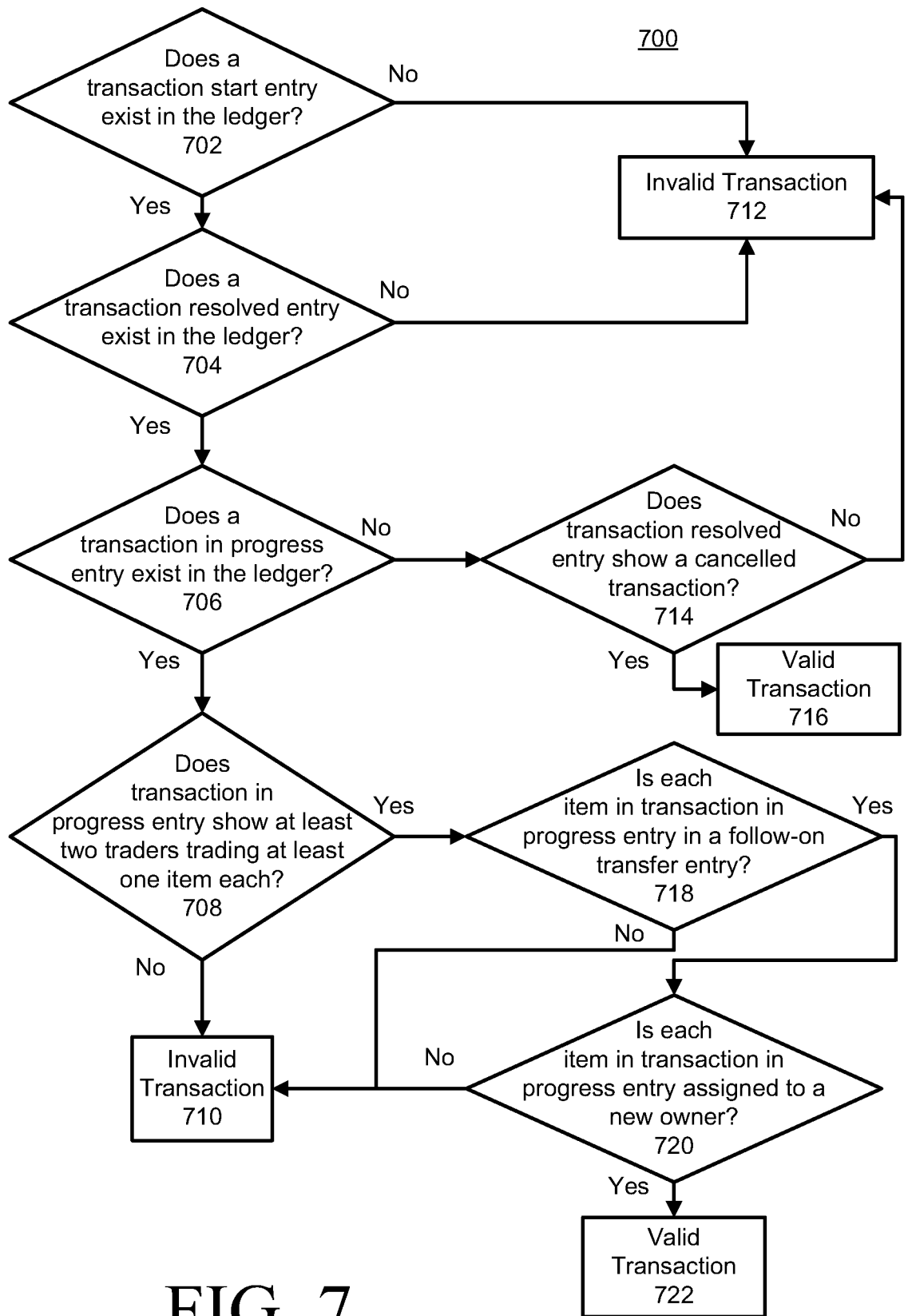
FIG. 7 is a flowchart of an example method of transaction verification in accordance with some implementations.

FIG. 7 is a flowchart of an example method of transaction verification in accordance with some implementations. A transaction can be verified using the ledger by testing for the presence of the following entries and data:

At 702, it is determined whether a transaction start entry exists in the ledger for the transaction that is to be verified. The transaction start entry can be identified by using a user (e.g., User 1 or User 2) or an item (e.g., Item A or Item B) identifier as a search value. If no transaction start entry exists, processing continues to 712, where the transaction is determined to be invalid; otherwise processing continues to 704.

At 704, it is determined whether a transaction resolved entry exists in the ledger for the transaction to be verified. If no transaction start entry exists, processing continues to 712, where the transaction is determined to be invalid; otherwise processing continues to 706.

At 706, it is determined whether a transaction in progress entry exists in the ledger for the transaction to be verified. If no transaction start entry exists, processing continues to 714; otherwise processing continues to 708.

At 708, it is determined whether the transaction in progress entry for the transaction to be verified shows at least two traders trading at least one item each. If so, processing continues to 718; otherwise processing continues to 710, where the transaction is determined to be invalid.

At 714, it is determined whether a transaction resolved entry (for the transaction to be verified) exists in the ledger that shows a cancelled transaction. If so, the transaction is determined to be valid (716); otherwise the transaction is determined to be invalid (712).

At 718, it is determined whether each item in the transaction in progress entry (for the transaction to be verified) is listed in a follow-on transfer entry (e.g., 606 or 608). If so, processing continues to 720; otherwise the transaction is determined to be invalid (710).

At 720, it is determined whether each item in the transaction in progress entry (for the transaction to be verified) is assigned to a new owner e.g., 610 or 612). If so, the transaction is determined to be valid (722); otherwise the transaction is determined to be invalid (710).

In the event of a dispute about a transaction, the entire history of the transaction can be validated using the ledger as described above in in connection with FIG. 7, If the transaction is determined to valid, then a claim about the transaction can, in turn, be validated, for example a claim in which if a user denies being a party to the transaction or a claim in which the user claims they did not receive the item they were expecting. There is also another type of claim in which one or more users assert a technical error prevented the transaction form completing or resolving.

Figure 8:
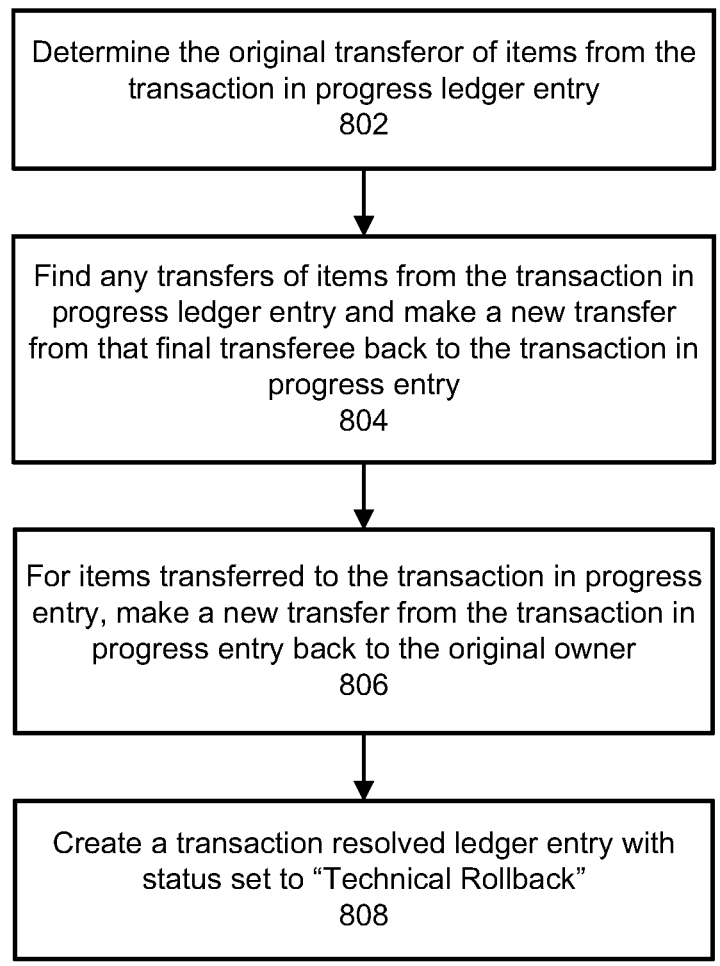
FIG. 8 is a flowchart of an example method of claim verification for a technical error claim in accordance with some implementations.

FIG. 8 is a flowchart of an example method 800 of claim verification for a technical error claim in accordance with some implementations. When a transaction was not completed successfully due to a technical processing error, a valid transaction resolved entry will not exist in the secure ledger. To reverse any partial trades in the transaction, method 800 can be performed. Method 800 begins at 802, where the original transferor of items is determined from the transaction in progress ledger entry. Processing continues to 804.

At 804, transfers of items from the transaction in progress entry to a final transferee are identified and a new transfer is made from that final transferee back to the transaction in progress entry. Processing continues to 806.

At 806, for items transferred to the transaction in progress entry, a new transfer is made from the transaction in progress entry back to the original transferor. Processing continues to 808.

At 808, a transaction resolved ledger entry is created with a status set to "Technical Rollback". This status can be used to indicate how the transaction was resolved for future queries of the transaction. The parties can start a new transaction sequence (e.g., method 500) is a trade is still desired.

Figure 9:
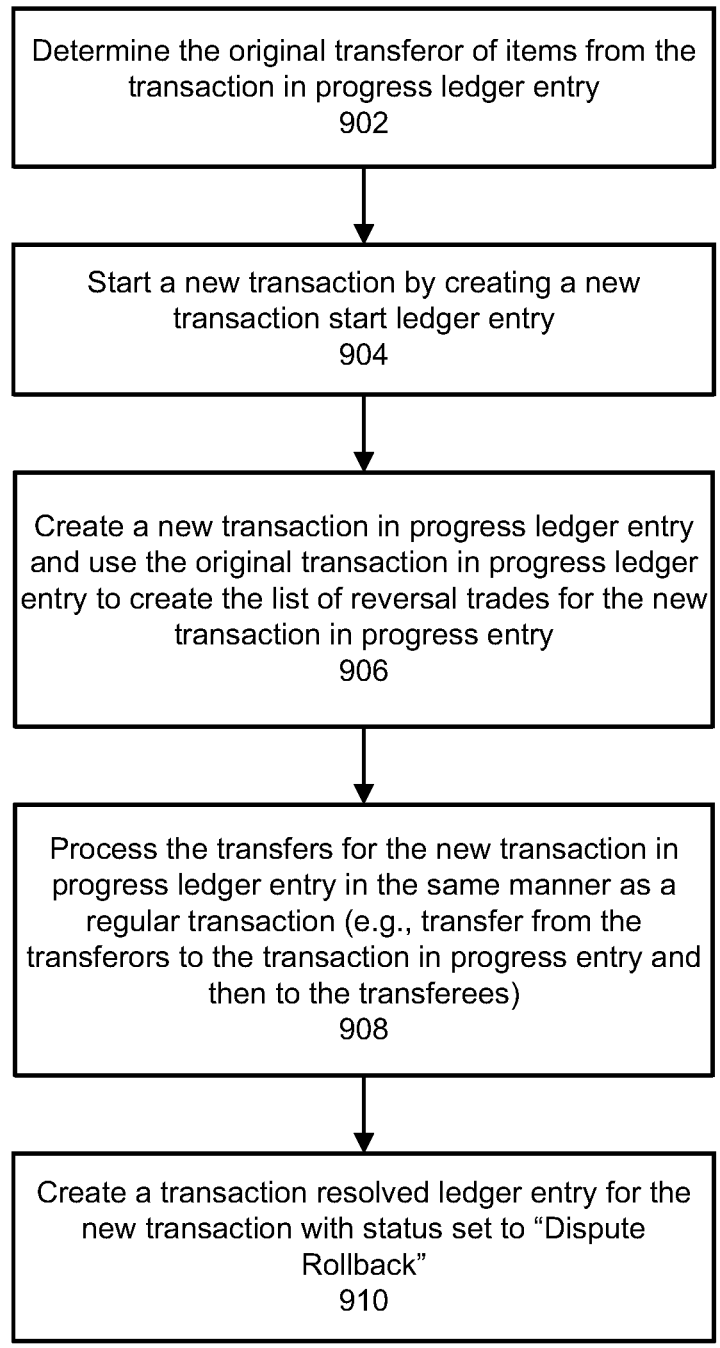
FIG. 9 is a flowchart of an example method of claim verification for a user dispute claim in accordance with some implementations.

FIG. 9 is a flowchart of an example method 900 of claim verification for a user dispute claim in accordance with some implementations. In the case of a completed transaction (e.g., a valid transaction resolved ledger entry exists) that is disputed, and a reversal is required, method 900 can be performed. Method 900 begins at 902, where the original transferor of items from the original transaction in progress ledger entry is determined. Processing continues to 904.

At 904, a new transaction is started by creating a new transaction start ledger entry. Processing continues to 906.

At 906, a new transaction in progress ledger entry is created. The original transaction in progress ledger entry is utilized to create the list of reversal trades for the new transaction in progress ledger entry. Processing continues to 908.

At 908, transfers for the new transaction in progress ledger entry are processed in a similar manner as a regular transaction (i.e., transfer from transferors to the transaction in progress entry and then from there to the transferees). Processing continues to 910.

At 910, a transaction resolved ledger entry for the new transaction with status set to "Dispute Rollback".

Some implementations can include adding waiting time during a transaction and also after a transaction to provide time for disputes and remediation in situation having low trust situations (e.g., a trust value below a given threshold). Low trust could be based on properties such as a user's newness to trading (as determined by a number and/or type of prior transactions associated with the user account), a user's prior history of disputes in trading (based on entries in the ledger that are associated with the user account), prior user history of other kinds of infractions on the collaboration platform, etc.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The sequence of operations is those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "performing," "generating," "receiving," "determining," "verifying," "identifying," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

In additional implementations, one or more processing devices for performing the operations of the above described implementations are disclosed. Additionally, in implementations of the disclosure, a non-transitory computer-readable storage medium stores instructions for performing the operations of the described implementations. Also, in other implementations, systems for performing the operations of the described implementations are also disclosed.

What is claimed is:

1. A method, comprising:

receiving, at a collaboration platform, an indication of a start of a transaction between a first user account and a second user account of the collaboration platform;

responsive to the indication, generating, by the collaboration platform, a transaction start entry in a secure ledger, the transaction start entry including a hash value and a previous entry hash value associated with a previous entry in the secure ledger, and the transaction start entry including a first user account identifier associated with the first user account and a second user account identifier associated with the second user account;

receiving, at the collaboration platform, a first identifier of a first virtual item to be transferred from the first user account to the second user account within the collaboration platform as a first part of the transaction;

receiving, at the collaboration platform, a second identifier of a second virtual item to be transferred from the second user account to the first user account within the collaboration platform as a second part of the transaction;

performing the transaction by generating a plurality of entries in the secure ledger to record the first part of the transaction and the second part of the transaction, wherein each entry in the secure ledger is linked to a preceding entry in the secure ledger using one or more hash values and includes one of the first identifier or the second identifier; and creating, using the collaboration platform, a transaction resolved entry in the secure ledger indicating that the transaction has been resolved.

2. The method of claim 1, further comprising:
receiving a claim from the first user account to dispute the transaction;
responsive to the claim, performing, using the collaboration platform, a transaction verification operation; and
when a result of the transaction verification operation indicates that the transaction was not resolved according to a transaction in progress entry in the secure ledger, performing an account restore operation based on the secure ledger, wherein the account restore operation retrieves the first virtual item from another user account identified as a last entry in the secure ledger having possession of the first virtual item and restores the first virtual item to the first user account.

3. The method of claim 2, wherein the first identifier of the first virtual item comprises a unique identifier that is associated with the first virtual item and the second identifier of the second virtual item comprises a unique identifier that is associated with the second virtual item.

4. The method of claim 2, wherein the collaboration platform is a virtual game platform.

5. The method of claim 2, wherein the first virtual item and the second virtual item are virtual game items.

6. The method of claim 5, wherein the virtual game items are user-generated virtual game items.

7. The method of claim 2, further comprising:
generating one or more additional entries in the secure ledger based on the account restore operation, wherein the one or more additional entries record one or more additional transactions to transfer the first virtual item from the user account identified as the last entry in the secure ledger to the first user account.

8. The method of claim 2, further comprising:
responsive to performing the account restore operation, performing a punitive operation on the second user account.

9. The method of claim 8, wherein the punitive operation includes one of suspending the second user account, terminating the second user account, or suspending a particular function of the second user account while maintaining an ability to execute other functions of the second user account.

10. A system, comprising:
a processing device; and
a memory, coupled to the processing device and having software instruction stored thereon that, when executed by the processing device, cause the processing device to perform operations including:
receiving an indication of a start of a transaction between a first user account and a second user account of a collaboration platform;
responsive to the indication, generating, by the collaboration platform, a transaction start entry in a secure ledger, the transaction start entry including a hash value and a previous entry hash value associated with a previous entry in the secure ledger, and the transaction start entry including a first user account identifier associated with the first user account and a second user account identifier associated with the second user account;
receiving a first identifier of a first virtual item to be transferred from the first user account to the second user account within the collaboration platform as a first part of the transaction;
receiving a second identifier of a second virtual item to be transferred from the second user account to the first user account within the collaboration platform as a second part of the transaction;
performing the transaction by generating a plurality of entries in the secure ledger to record the first part of the transaction and the second part of the transaction, wherein each entry in the secure ledger is linked to a preceding entry in the secure ledger using one or more hash values and includes one of the first identifier or the second identifier; and
creating a transaction resolved entry in the secure ledger indicating that the transaction has been resolved.

11. The system of claim 10, wherein the operations further comprise:
receiving a claim from the first user account to dispute the transaction;
responsive to the claim, performing a transaction verification operation; and
when a result of the transaction verification operation indicates that the transaction was not resolved according to a transaction in progress entry in the secure ledger, performing an account restore operation based on the secure ledger that retrieves the first virtual item from another user account identified as a last entry in the secure ledger having possession of the first virtual item and restores the first virtual item to the first user account.

12. The system of claim 11, wherein the first identifier of the first virtual item comprises a unique identifier that identifies the first virtual item.

13. The system of claim 11, wherein the second identifier of the second virtual item comprises a unique identifier that identifies the second virtual item.

14. The system of claim 11, wherein the operations further comprise:
generating one or more additional entries in the secure ledger based on the account restore operation, wherein the one or more additional entries record one or more additional transactions to transfer the first virtual item from the user account identified as the last entry in the secure ledger to the first user account.

15. The system of claim 11, wherein the operations further comprise:
responsive to performing the account restore operation, performing a punitive operation on the second user account.

16. The system of claim 15, wherein the punitive operation includes one of suspending the second user account, terminating the second user account, or suspending a particular function of the second user account while maintaining an ability to execute other functions of the second user account.

17. A non-transitory computer readable medium comprising software instructions that, when executed by a processing device, cause the processing device to perform operations including:
receiving an indication of a start of a transaction between a first user account and a second user account of a collaboration platform;
responsive to the indication, generating, by the collaboration platform, a transaction start entry in a secure ledger, the transaction start entry including a hash value and a previous entry hash value associated with a previous entry in the secure ledger, and the transaction start entry including a first user account identifier associated with the first user account and a second user account identifier associated with the second user account;

receiving a first identifier of a first virtual item to be transferred from the first user account to the second user account within the collaboration platform as a first part of the transaction;

receiving a second identifier of a second virtual item to be transferred from the second user account to the first user account within the collaboration platform as a second part of the transaction;

performing the transaction by generating a plurality of entries in the secure ledger to record the first part of the transaction and the second part of the transaction, wherein each entry in the secure ledger is linked to a preceding entry in the secure ledger using one or more hash values and includes one of the first identifier or the second identifier; and creating a transaction resolved entry in the secure ledger indicating that the transaction has been resolved.

18. The non-transitory computer readable medium of claim 17, comprising further software instructions that, when executed by a processing device, cause the processing device to perform operations including:

receiving a claim from the first user account to dispute the transaction;

responsive to the claim, performing a transaction verification operation; and when a result of the transaction verification operation indicates that the transaction was not resolved according to a transaction in progress entry in the secure ledger, performing an account restore operation based on the secure ledger that retrieves the first virtual item from another user account identified as a last entry in the secure ledger having possession of the first virtual item and restores the first virtual item to the first user account.

19. The non-transitory computer readable medium of claim 18, wherein the first identifier of the first virtual item comprises a unique identifier that identifies the first virtual item and the second identifier of the second virtual item comprises a unique identifier that identifies the second virtual item.

20. The non-transitory computer readable medium of claim 18, wherein the collaboration platform is a virtual game platform, and wherein the first virtual item is a virtual game item.

* * * * *